United States Patent [19]
Walden et al.

[11] 3,744,043
[45] July 3, 1973

[54] ENVIRONMENTAL DATA SYSTEM

[75] Inventors: Richard M. Walden, Roger E. Medlin, Robert A. Warren, Delbert D. Weers, all of Raleigh, N.C.

[73] Assignee: Westinghouse Electric Corporation, Pittsburgh, Pa.

[22] Filed: June 1, 1971

[21] Appl. No.: 148,478

[52] U.S. Cl. ................................. 340/213 R, 206, 248 P
[51] Int. Cl. ................................. G08b 23/00
[58] Field of Search ................................. 340/150, 151, 163, 206, 413, 213 R, 248 P

[56] References Cited

UNITED STATES PATENTS

| | | | |
|---|---|---|---|
| 3,068,458 | 12/1962 | Hansson et al. | 340/206 |
| 3,609,729 | 9/1971 | Anderson | 340/206 |

*Primary Examiner*— Donald J. Yusko
*Attorney*— A. T. Stratton, Donald R. Lackey

[57] ABSTRACT

An environmental data system which continuously records the output of one or more field located environmental sensors, and which establishes a communication link with a remote central control station when the output of any of the sensors, over a predetermined period of time, exceeds a predetermined threshold magnitude. When the communication link is established, data relative to the sensors is automatically transmitted to the central control station, along with suitable station and sensor identification. The communication link may also be activated from the central control system, to monitor the latest sensor readings at any field location.

22 Claims, 4 Drawing Figures

3,744,043

ENVIRONMENTAL DATA SYSTEM

ABSTRACT OF THE DISCLOSURE

An environmental data system which continuously records the output of one or more field located environmental sensors, and which establishes a communication link with a remote central control station when the output of any of the sensors, over a predetermined period of time, exceeds a predetermined threshold magnitude. When the communication link is established, data relative to the sensors is automatically transmitted to the central control station, along with suitable station and sensor identification. The communication link may also be activated from the central control system, to monitor the latest sensor readings at any field location.

CROSS REFERENCE TO RELATED APPLICATION

Certain of the apparatus disclosed but not claimed herein, is claimed in co-pending application, Ser. No. 148477, filed June 1, 1971 which application is assigned to the same assignee as the present application.

BACKGROUND OF THE INVENTION

Field of The Invention

The invention relates in general to environmental data systems, and more specifically to systems for monitoring and recording environmental variables, and alerting a remote central station when a variable exceeds a predetermined threshold value over a predetermined time interval.

Description of The Prior Art

It is becoming increasingly more important to continuously monitor certain environmental variables, and to make decisions based on air or water quality. Continuous monitoring is necessary in order to determine if controls should be imposed in order to regulate the pollution level, the degree of control required, and whether the degree of control is sound and being maintained.

Environmental control systems of the prior art have been of many different types. For example, visual and recorded readings have been manually converted to punched cards, which are analyzed with the aid of a computer. Other systems log instantaneous sensor readings at predetermined time intervals, punching the readings directly on paper tape. The punched tape is used to convert the data to punched cards for computer use. Magnetic tape has been used to record data along with a suitable time pulse, with the magnetic tape being collected periodically and translated to computer input information. On-line or real time computers have been used which continuously collect environmental data from sensors and issue an alarm when a pollutant level is too high. Centralized data acquisition systems have been used which sample sensors by scanning a number of sensors in a predetermined sequence.

All of these prior art systems have disadvantages in certain applications. Manually punching cards from visual and recorded measurements is slow, and the amount of data collected is relatively small, resulting in inaccuracies. The punching on tape of instantaneous sensor readings is also inaccurate, unless the time period between readings is very short, and the punched paper tape apparatus requires a substantial amount of maintenance. The magnetic tape methods provide accurate data which may be interpreted quickly once the magnetic tape is translated into computer input language, but it provides no means for alerting a central control station at the time a safe pollution level is exceeded. On-line computers are costly, and restrictive in the location and number of field locations and sensors. Real time systems which operate by scanning sensors, require a data channel for each sensor to the control center scanner, and are thus costly, and also inaccurate unless the scanning rate is very high.

Thus, it would be desirable to provide a new and improved environmental data system which continuously monitors environmental sensors, records the readings for later computer aided analysis, and which is also capable of alerting a remotely located central control station on a real time basis when a pollutant level exceeds a predetermined magnitude. It would also be desirable to be able to monitor the sensors at any field location upon demand, and to be able to do so without losing the indication of an "alarm" condition which occurs during the monitoring.

SUMMARY OF THE INVENTION

Briefly, the present invention is a new and improved environmental data system which continuously records digital signals responsive to the sensed variables, on separate channels of magnetic tape, along with a time channel on the tape which enables the recorded data to be related to time. Sensors which output a contact closure at a rate proportional to the magntiude of the variable sensed may be connected to a channel of the recording means without substantial change, while sensors which output a continuous signal having a magnitude proportional to the variable being sensed, are connected to the recording means via integrating circuitry to convert the analog signal to a pulse rate. The magnetic tape is periodically collected and translated to computer compatible input.

The digital output associated with each sensor is also applied to a counter which starts the count for its associated sensor with a timing pulse from the recording means. The accumulated count at the time the next timing pulse is received is transferred to a memory register for storage means, and the counter is reset to start counting the pulses received during the next time interval.

The count for each sensor is compared with a predetermined threshold value, either on the output of the counters, or on the output of the storage means. If none of the counts associated with the sensors exceed their preset thresholds, the storage means may release its count, or it may retain the count until the next timing pulse, at which time it may be reset, or simply be written over by the new count.

If the threshold of any sensor is exceeded, a control or alarm signal is generated immediately, but it is stored in first alarm storage means until the end of the time interval, at which time the stored alarm signal activates or establishes a communication link from the field location of the sensors to a remotely located central control station. When the communication link is established, the sensor readings are transferred to the central station where they are recorded and a station alarm may also be activated. The transmission of the sensor data is accompanied by station and sensor identification, as well as an end of message code after all of the sensor information has been clocked out.

The communication link between the central station and the field located sensors may also be activated at any time for the control station, to permit monitoring of the latest sensor readings, as well as to determine if the sensors are operating properly. Means for storing an alarm signal which may occur while the sensors are being monitored by the central control station, is provided, which precludes the possibility of losing an alarm signal due to monitoring.

BRIEF DESCRIPTION OF THE DRAWINGS

The invention may be better understood, and further advantages and uses thereof more readily apparent, when considered in view of the following detailed description of exemplary embodiments, taken with the accompanying drawings, in which.

DESCRIPTION OF PREFERRED EMBODIMENTS

Figure 1:
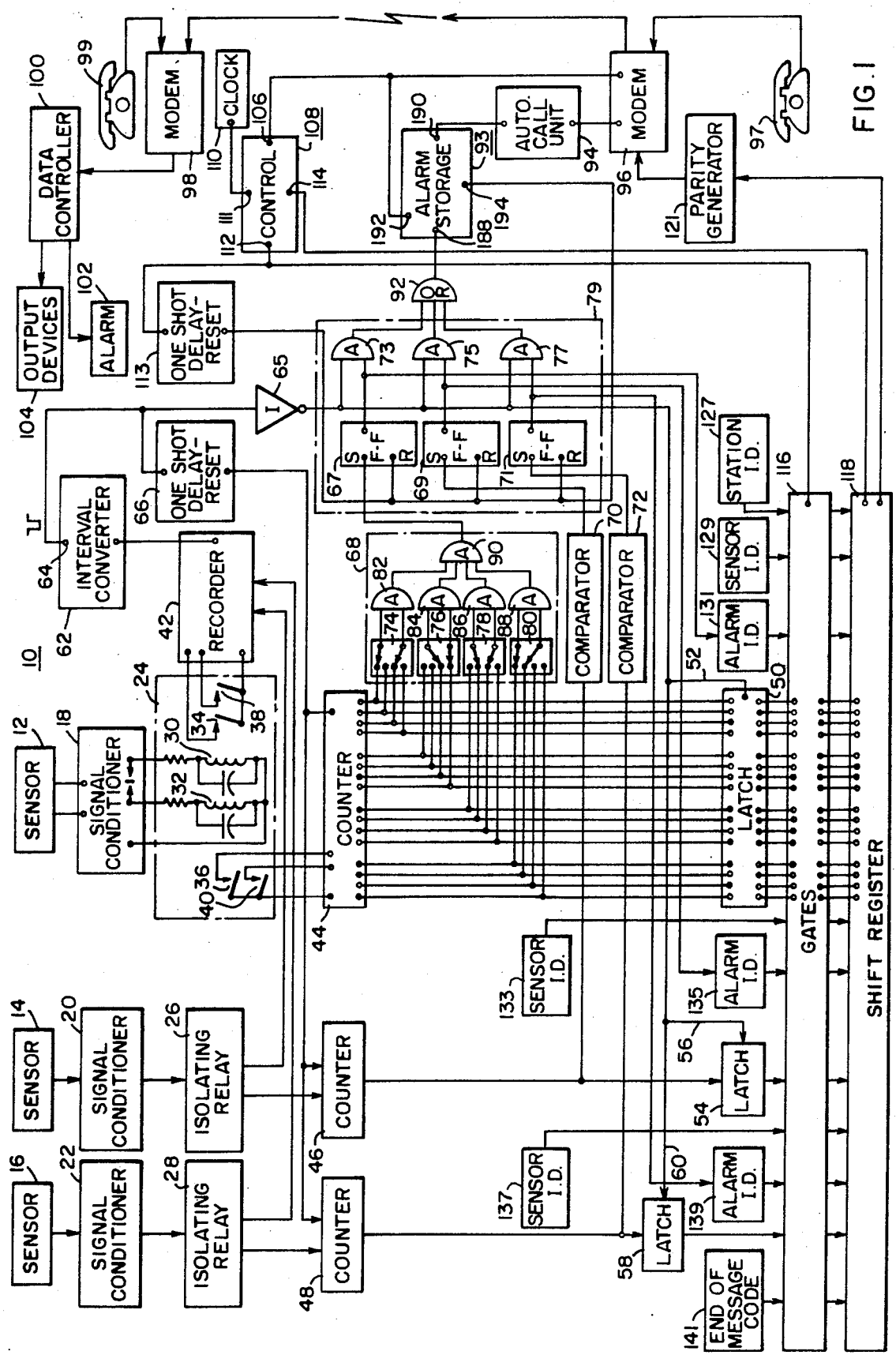
FIG. 1 is a block diagram illustrating an environmental monitoring and alerting system constructed according to the teachings of the invention.

Referring now to the drawings, and FIG. 1 in particular, there is illustrated an environmental data system 10 constructed and arranged according to the teachings of the invention. Environmental data system 10 includes a plurality of sensors, such as sensors 12, 14 and 16, which are disposed at a field location. Typical environmental sensors are those for measuring pollutants, such as particulates, nitrous oxides and sulphur dioxide in air, and water pollutants, as well as those for measuring rainfall, wind direction and velocity, sun light, humidity, barometric pressure, solar radiation, water temperature, soil temperature, and the like.

Typical sensors output a continuous electrical signal, voltage or current, proportional to the variable being sensed, and if they are of this type an electronic integrator with a three-wire pulse initiator, referred to generally as a signal conditioner, would be required to change the continuous signal to a pulse rate. Thus, as illustrated in FIG. 1, signal conditioners 18, 20 and 22 are connected to the outputs of sensors 12, 14 and 16, respectively. If a parameter sensor outputs a three-wire contact closure, a signal conditioner for that sensor would not be required.

Two isolated pulse outputs are required for each of the sensors 12, 14 and 16, which may be provided by isolating relays 24, 26 and 28, respectively. As illustrated relative to isolating relay 24, the relay may include first and second electromagnetic coils 30 and 32, respectively, with coil 30 having contacts 34 and 36 associated therewith, and coil 32 having contacts 38 and 40 associated therewith. Contacts 34 and 38 are interconnected to provide a first three wire output, and contacts 36 and 40 are interconnected to provide a second three wire output.

The first three wire outputs of the isolating relays are all connected to recording means 42. Recording means 42 is preferably a magnetic tape recorder 42 having a plurality of channels, depending upon how many sensors it is to serve, with one of the channels being for time pulse information, which is provided by the recorder and recorded on the magnetic tape in order to relate the data pulses recorded on each of the other channels to time. Typical time intervals are 15, 30 or 60 minutes. Available recorders, such as the recorder disclosed in U.S. Pat. No. 3,059,239, which is assigned to the same assignee as the present application, conventionally use a plug-in type cartridge which holds a supply of magnetic tape sufficient for a relatively long period of time, such as 36 days. Since each data pulse is proportional to a measured quantity, the data pulses can be totalized for each time interval and the average quantity measured per time interval determined. The field tape is collected periodically, such as every 30 days, and taken to a central control station for translation to computer input compatibility. The translator converts the time and data pulses to computer oriented language on punched cards, or magnetic computer tape. A programmable tape-to-tape translation system which may be used is disclosed in co-pending application Ser. No. 143,428, filed May 14, 1971.

While the field tape presents accurate information which may be analyzed, and used to base decisions relative to environmental pollution, such as whether or not controls are necessary, the degree of control, and the effectiveness of a control, it provides no means for alerting the central control center on a real time basis when safe pollution levels are exceeded. Further, the recorder 42 may not be remotely monitored from the control center in order to determine if the sensors are operating properly, or to determine the latest sensor readings.

These features are provided by the present invention, by connecting the second three wire output of each isolating relay to binary counters, or binary coded decimal counters, as desired. Thus, the second output of isolating relay 24 is connected to counter register 44, the second output of isolating relay 26 is connected to counter 46, and the second output of isolating relay 28 is connected to counter 48.

Counters 44, 46 and 48 are connected to storage means to enable the counters to be reset at the end of a timing interval, while retaining their accumulated counts in the storage means. The storage means may be a memory register, which, upon command, assumes the state of all of the flip-flops in the counters, or, as illustrated, it may be a group of latches which assume and follow the count of their associated binary counters when the latch lines are driven "high," and which holds the count therein at the time their latch lines are driven "low." The counters and latches may be conventional, such as Texas Instrument types SN7493N and SN7475N, respectively. As illustrated, latch 50 is connected to store the count of counter 44 when its latch line 52 is driven low, latch 54 stores the count of counter 46 when its latch line 56 is driven low, and latch 58 stores the count of counter 48 when its latch line 60 is driven low.

The latch lines 52, 56 and 60 may be driven high to allow the latches to assume the counts of their associated counters, and then low to hold the count, as well as resetting the counters at the proper times, by using the interval or timing pulses produced by the recorder 42. As illustrated, an interval converter 62 which provides the desired logic level outputs, may be connected to obtain the timing pulses of the recorder 42 and provide the required logic levels for resetting and setting the latches, and resetting the counter. Output terminal 64 of interval converter 62 is connected to the latch lines 52, 56 and 60 via an inverter 65, driving the latch lines high to enable them to reset and pick up the accumulated counts of their associated counters, and then low to hold their newly acquired counts, with a single interval pulse. Output terminal 64 is also connected to a one shot reset multivibrator 66, whose output is delayed for a sufficient period of time to assure that the latches 50, 54 and 58 are set. The soutput of the one shot 66 is connected to counters 44, 46 and 48, resetting them to zero in response to a timing pulse, to enable them to start counting the pulses occurring during the next interval of time. The latch lines are thus held low, until an interval pulse is received, with the latches being reset to pick up the latest interval counts, and immediately set to hold the new counts, with a single pulse.

When one of the counters accumulates a pulse count during a timing interval which reaches a preset threshold for its associated sensor, an "alarm" condition exists which is stored in first alarm storage means until the end of the interval, at which time the alarm condition is automatically communicated to the central control station. This comparison of the counts with predetermined threshold values may be performed at the outputs of the counters as illustrated, or, at the outputs of the latches, depending upon the type of comparison means used.

The threshold magnitudes for each sensor are set by comparators 68, 70 and 72 associated with the output of counters 44, 46 and 50, respectively. Each comparator includes adjustable selectors, such as selectors 74, 76, 78 and 80 associated with comparator 68. Each comparator also includes a gate associated with each adjustable selector, such as gates 82, 84, 86 and 88, associated with adjustable selectors 74, 76, 78 and 80, respectively, and a gate 90 responsive to the outputs of gates 82, 84, 86 and 88. Gate 90 outputs a signal when the preset count of its comparator is reached.

If none of the comparators output an alarm signal during a time interval, the counters are reset by the interval pulse and the comparators automatically monitor the counters during the next time interval.

When one of the counters 44, 46, or 48 reaches the threshold count preset on its associated comparator during a time interval, this "alarm condition" is not used to immediately initiate a communication with the central control station. The fact that an alarm condition exists, and the identification of the associated sensor, is stored in first alarm storage means 79 until the end of the time interval. This feature enables the full count for the time interval to be accumulated by the counters and transferred to the latches, and it thus gives the other comparators the opportunity to determine if their associated counters will reach their preset thresholds during the time interval.

This storage of an alarm signal or signals, until an interval pulse is received is performed by the first alarm storage circuit 79, and it includes a flip-flop and an AND gate for each comparator.

More specifically, the first alarm storage means 79 includes flip-flops 67, 69 and 71, and AND gates 73, 75, and 77, with the set inputs of flip-flops 67, 69 and 71 being connected to the outputs of comparators 68, 70 and 72, respectively. The set outputs of flip flops 67, 69 and 71 are connected to an input of AND gates 73, 75 and 77, respectively. The other input of each AND gate is connected to enable its associated gate upon receipt of a time interval pulse. Thus, as illustrated, each of the AND gates 73, 75 and 77 may be connected to the output of inverter 65, to receive the same signal used by the latches to pick up and hold the latest counts of their counters at an interval pulse. If one of the comparators initiates an alarm signal and sets it associated flip-flop in the first alarm storage means 79, this alarm signal is applied through its gate upon receiving an interval pulse, to an OR gate 92. The output of OR gate 92 is used to activate a communication link from the field location of the sensors to the remotely located central control station. While this communication link may be power line carrier, microwave, radio, or any other suitable communication means, it is preferably a conventional telephone network, and for purposes of example it will be so described.

The alarm signal from the gate 92 is applied to second alarm storage means 93, which functions to store the alarm signal only when the field location is being monitored by the central control station. When the communication link is inactive, the second alarm storage means passes the output of OR gate 92 to the automatic calling unit 94, such as Western Electric type 801–A. The automatic calling unit 94 signals Modem 96, such as a Western Electric type 103 data set, to establish a phone connection from Modem 96 at the field location to Modem 98 located at the central control station. Modem 98 is connected to a data controller 100, which controls a station alarm 102, and output devices 104, such as a magnetic tape recorder, paper tape punch machine, or the like.

When Modem 96 secures a phone line in response to a signal from automatic calling unit 94, and is ready to transmit data to Modem 98, Modem 96 provides a "ready to send" signal to input terminal 106 of a control circuit 108. Control circuit 108 includes a clock 110 for providing a train of pulses at its input terminal 111, a first output terminal 112 for outputting the first full clock pulse following the application of a "ready" signal to input terminal 106, and a second output terminal 14 for outputting the subsequent clock pulses for the duration of the "ready" signal provided by Modem 96.

The outputs of the latches 50, 54 and 58 are connected to gates 116, and the outputs of the gates 116 are connected to a parallel to serial converter, or shift register 118. The first output terminal 112 of control 108 is connected to gates 116, with the appearance of a clock pulse at terminal 112 loading the count from the latches 50, 54 and 58 into the shift register 118 via the gates 116. The second output terminal 114 of control circuit 108 is connected to shift register 118, with the clock pulses following the clock pulses applied to gates 116 clocking out the data from the shift register 118.

The output data is identified as to field location by station identification means 127, which is adjusted to load the location code into gates 116 when the gates 116 are enabled, the individual sensors are identified in like manner by sensor identification means 129, 133 and 137, and the sensor initiating an alarm is identified by alarm identification means 131, 135 and 139, which are set to "alarm condition" by the outputs of flip-flops 67, 69 and 71, respectively, of the first alarm storage means 79. A parity generator 121 is connected to the output of shift register 118, and the output of parity generator 121 is connected to the input of Modem 96. After the count associated with all of the sensors is clocked out, an end of transmission code is provided by means 141, which terminates the communication link.

In addition to alerting the remote central control station on a real time basis when an "alarm" condition exists, and transmitting the sensor data to the remote central control station, the communication link may be established at either end of the link, as indicated by phones 97 and 99. For example, the central control station may initiate the communication link by "dialing" the code number of the desired remote station. The Modem 96, in this instance, would signal control 108 to initiate the signal for loading the information in the latches into the shift register 118 via the gates 116, and also to clock out the data from the shift register. This permits the sensors to be monitored, to check whether or not they are operating properly, and also enables the central control station to obtain the latest sensor readings upon command at any time.

Figure 2:
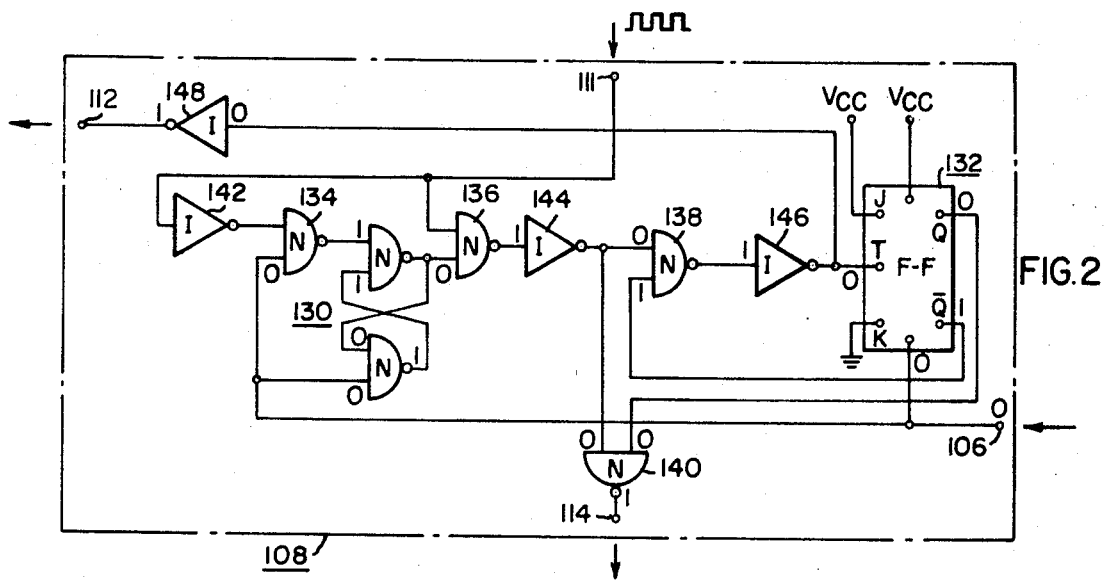
FIG. 2 is a logic diagram of control apparatus which may be used with the invention for controlling certain functions thereof.

A control circuit 108 which may be used to provide the necessary signals for controlling the loading of data into the shift register 118, and the clocking out of the data from the shift register 118, is shown in FIG. 2.

More specifically, control circuit 108 includes first and second flip-flops 130 and 132, first, second, third and fourth NAND gates 134, 136, 138 and 140, respectively, and first, second, third and fourth inverters 142, 144, 146 and 148, respectively.

Input terminal 106, which receives signals from Modem 96, is connected to the reset terminals of the first and second flip-flops 130 and 132, and to an input of the first NAND gate 134. Input terminal 111, which receives clock pulses from clock 110, is connected to an input of the second NAND gate 136 and to the input of inverter 142. The first output terminal 112 is connected to the output of inverter 148, and the second output terminal 114 is connected to the output of the fourth NAND gate 140.

The output of inverter 142 is connected to the remaining input of NAND gate 134, and the output of NAND gate 134 is connected to the set input of the first flip-flop 130. The set output of flip-flop 130 is connected to the remaining input of the second NAND gate 136. The output of the second NAND gate 136 is connected to inverter 144, and the output of inverter 144 is connected to an input of the third NAND gate 138, and to an input of the fourth NAND gate 140. The set output Q of the second flip-flop 132 is connected to the other input of the fourth NAND gate 140, and the reset output $\bar{Q}$ of the second flip-flop 132 is connected to the remaining input of the third NAND gate 138. The output of the third NAND gate 138 is connected to inverter 146, and the output of inverter 146 is connected to inverter 148 and to the toggle terminal T of the second flip-flop 132.

Means including the first NAND gate 134 and the first flip-flop 130 start the circuit operation on the first full clock pulse following the application of a circuit start signal to input terminal 106. A "zero" logic level at input terminal 106 resets flip-flops 130 and 132 and clamps them. The logic levels for this circuit condition are indicated in FIG. 2. When the Modem 96 establishes a communication link between the field location and remote central control station, it applies a logic "one" to input terminal 106, which removes the clamp on the flip-flops and applies a logic one to an input of the first NAND gate 134. If the input terminal 106 goes high during a clock pulse from clock 110, gate 134 is blocked by the logic zero applied to NAND gate 134 by inverter 142. This prevents starting the circuit on a "sliver" or portion of a clock pulse. The first clock zero following the application of a signal to input terminal 106, appears at the input of first NAND gate 134 as a logic one, and NAND gate 134 therefore changes its output to a logic zero, toggling flip-flop 130 and applying a logic one to the second NAND gate 136. NAND gate 136 thus changes its output to a "zero" upon receiving the first full clock pulse following a circuit start signal at its input terminal 106.

Means including the second and third NAND gates and the second flip-flop direct the first full clock pulse to the first output terminal 112.

More specifically, the zero input to inverter 144 applies a logic one to the third NAND gate 138 and to the fourth NAND gate 140. The fourth NAND gate remains blocked, however, due to the logic zero applied to its other input by the second flip-flop 132. The third NAND gate 138, however, changes its output to a logic zero, which is inverted by inverters 146 and 148, to change the signal at output terminal 112 from a logic one to a logic zero. This change in the logic level of output terminal 112, representing the first full clock pulse following the circuit start signal applied to input terminal 106, is applied to the gates 116 shown in FIG. 1, initiating the loading of the latch information into the shift register 118, via the gates 116.

The logic one output of inverter 146 is also applied to the toggle terminal T of the second flip-flop 132, and when it changes back to a logic zero level at the end of the first clock pulse, flip-flop 132 is toggled, blocking the third NAND gate from passing any further clock pulses, and enabling the fourth NAND gate 140 to apply all subsequent clock pulses to output terminal 114 via the second NAND gate 136, which has been enabled by the first flip-flop 130, and inverter 144. The clock pulses appearing at output terminal 114 are applied to shift register 118, in order to clock out the information stored therein. When all of the data has been clocked out of the shift register 118, the end of transmission code directs Modem 96 to terminate its "ready" signal, and input terminal 106 receives a logic zero which resets and clamps flip-flops 130 and 132.

Figure 3:
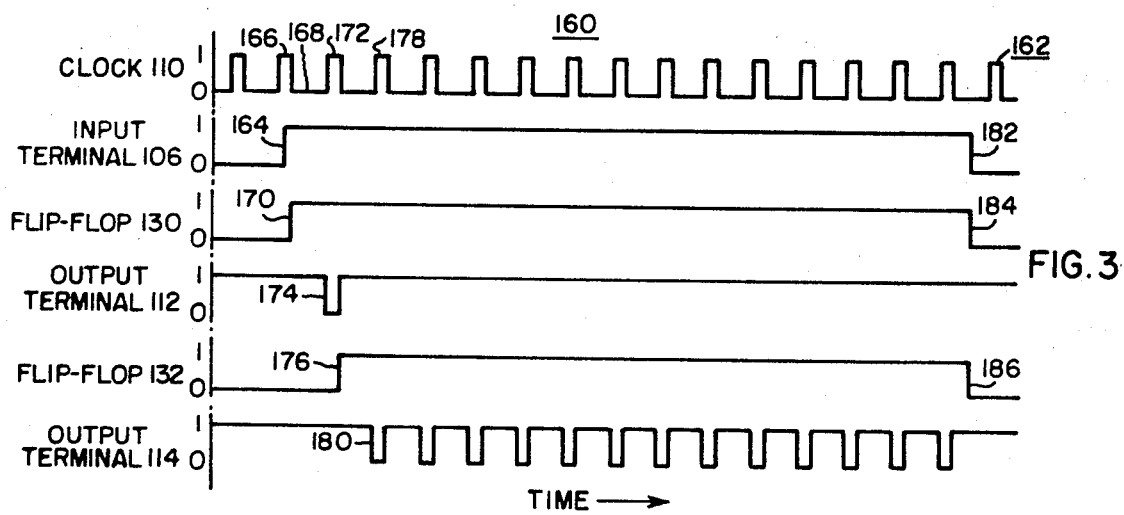
FIG. 3 is a graph which aids in the understanding of the control apparatus shown in FIG. 2.

FIG. 3 is a graph 160 which aids in understanding the operation of the control circuit 108 shown in FIG. 2. Graph 160 illustrates a train 162 of clock pulses from clock 110, and also the logic levels of input terminal 106, the set output of the first flip-flop 130, output terminal 112, the set output of the second flip-flop 132, and output terminal 114. For purposes of example, it will be assumed that the change 164 in logic level of input terminal 106, signaling that circuit 108 should start its operation, occurs during clock pulse 166. The first flip-flop 130, however, waits for the first clock zero 168 to occur, and it then changes its set output as illustrated at 170. The first full clock pulse 172 following the change 164 in logic level of input terminal 106, changes the logic level of input terminal 112, as indicated at 174, with the change lasting only for the duration of clock pulse 172. Change 174 enables gates 116 to load the information stored in the latches into the shift register 118. As illustrated, subsequent clock pulses are blocked from output terminal 112. Flip-flop 132 changes state at 176, coinciding with the termination of the first full clock pulse 172, enabling the fourth NAND gate 140 to pass all subsequent clock pulses, starting with clock pulse 178, to the second output terminal 114. The first clock responsive pulse appearing at output terminal 114 is referenced 180.

When the logic level of input terminal 106 changes at 182, following an end of transmission signal, flip-flops 130 and 132 are reset as indicated at 184 and 186, respectively, blocking subsequent clock pulses from affecting output terminals 112 and 114.

Figure 4:
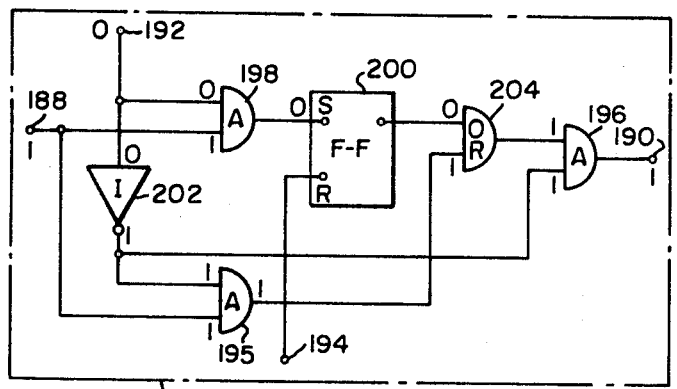
FIG. 4 is a logic diagram of alarm storage apparatus which may be used to preclude losing an alarm signal during monitoring.

Second alarm storage meens 93 which may be used to store an alarm signal from OR gate 92 in the event the communication link is already active, indicating that the field location is being monitored by the central control station at the time of an interval pulse, is shown in FIG. 4.

More specifically, the second alarm storage means 93 includes an input terminal 188 connected to the output of OR gate 92, an output terminal 190 connected to the input of the automatic calling unit 94, an input terminal 192 connected to be responsive to whether or not the field location is being monitored, such as to terminal 106 of control 108, and a reset terminal 194 which is used to reset the second alarm storage means 93 after it has been set to store an alarm signal, and the stored signal has been subsequently communicated to the automatic calling unit and a communication link is established in response to the alarm signal.

Alarm storage means 93 also includes first, second and third AND gates 195, 196 and 198, respectively, a flip-flop 200, an inverter 202, and an OR gate 204. The first AND gate 195 has one of its inputs connected to input terminal 188, the other input is connected to input terminal 192 via inverter 202, and its output is connected to an input of OR gate 204. The second AND gate has one of its inputs connected to the output of inverter 202, its other input to the output of OR gate 204, and its output is connected to output terminal 190. The third AND gate 198 has its two inputs connected to input terminals 188 and 192, and its output is connected to the set input of flip-flop 200. The reset input of flip-flop 200 is connected to the reset input terminal 194, and its set output is connected to another input of OR gate 204.

The logic levels indicated in FIG. 4 are for the condition where an alarm signal is applied to input terminal 188, and the field location is not being monitored. Therefore, the alarm signal applied to input terminal 188 should not be stored, but should be immediately applied to output terminal 190.

Input terminals 188 and 192 will thus be at the one and zero logic levels, respectively, causing AND gate 194 to apply a logic one to an input of OR gate 204 due to the inverter 202. The OR gate 204 thus outputs a logic one to one input of AND gate 196, and since the other input of AND gate 196 is also at the logic one level, the logic one applied to input terminal 188 is communicated to the output terminal 190.

If the field location is being monitored, input terminal 192 will be at the logic one level, as indicated relative to input terminal 106 of control circuit 108 in the graph of FIG. 3. AND gate 195 is thus blocked, and AND gate 198 outputs a logic one when the alarm signal appears at its input terminal 188. This sets flip-flop 200, applying a logic one to OR gate 204, and also to one of the input terminals of AND gate 196. The other input of AND gate 196 remains at the zero logic level until the monitoring is completed, at which time input terminal 192 returns to the zero logic level and AND gate 196 applies the stored alarm signal to terminal 190.

When the automatic calling unit 94 establishes the communication link and the gates 116 shown in FIG. 1 have transferred their data to the shift register 118, the flip-flop 200 in the second alarm storage means 93 may be reset, as well as the flip-flops 67, 69, and 71 in the first alarm storage means. This reset function may be initiated by the single output pulse 174 from output terminal 112 of control means 108, by connecting a one shot delay multivibrator 13 between output terminal 112 and the reset terminals of flip-flops 200, 67, 69, and 71, as shown in FIGS. 1 and 4.

In summary, there has been disclosed a new and improved environmental data system which continuously monitors and records on magnetic tape information relative to one or more environmental sensors, which information is very accurate and may therefore be used to base decisions on the degree of control necessary for controlling environmental pollutants.

The disclosed environmental data system also monitors each sensor output over a predetermined period of time, and compares the sensor output with a preset threshold value, in order to determine when safe pollution levels are exceeded. When a safe pollutant level is exceeded, an alarm condition exists which is stored in first alarm storage means until the end of the time interval, and it then, if the field location is not already being monitored, automatically activates a communication link from the field location of the sensors to a central control station. If the field location is being monitored, second alarm storage means stores the alarm signal until the monitoring terminates, and it then initiates the communication link to notify the central station of the alarm condition. When a communication link has been established, the data relative to each of the sensors at that field location is transmitted to the remote central control station where it may be recorded and available for immediate analysis. The communication link is preferably a conventional telephone network, which may use standard automatic calling units and Modems for establishing the communication link. The telephone link may also be used to establish a communication link at the option of the central control station to any selected field location, by calling the telephone number of the selected field location, and the latest sensor readings may be transmitted back to the central control station, to determine if the sensors are operating properly, and also to monitor the sensed variables at any time upon demand.

We claim as our invention:

1. An environmental monitoring and alerting system for continuously recording digital information at a field location, and for transmitting the digital information received over a predetermined time interval from the field location to a remote point when the information received during an interval exceeds a predetermined magnitude, comprising:

sensor means at the field location providing at least one channel of digital data responsive to a predetermined variable, timing means providing spaced pulses to establish predetermined time intervals therebetween, recording means connected to record said interval and digital data, counting means connected to count the digital data occurring during each time interval, count storage means for holding the count of said counting means at the end of each time interval, threshold means providing an output alarm signal in the event a preset count magnitude is reached during a time interval, a communication link from the count storage means to a remote point, said communication link being activated by an output alarm signal from said threshold means, and control means initiating the transfer of the data in said storage means to the remote point when said communication link is activated.

2. The system of claim 1 wherein the sensor means includes a sensor which provides a continuous data signal having a magnitude responsive to the variables to be monitored, and means converting the continuous data signal to data pulses having a frequency responsive to the magnitude of said data signal.

3. The system of claim 1 including reset means which resets the counting means to zero at the end of each time interval, after the count therein is held by the storage means.

4. The system of claim 1 wherein the count storage means includes latch means.

5. The system of claim 1 wherein the means initiating the transfer of data in the storage means to the remote point includes gate means, shift register means, and control means responsive to the communication link when it is activated to provide a signal for said gate means which transfers the data in the storage means to the shift register, and the data in the shift register means to the remote point.

6. The system of claim 1 including means at the remote point for initiating the transmission of data from the storage means to the remote point upon demand.

7. The system of claim 1 including alarm means at the remote point responsive to a threshold means initiated transmission of data to the remote point.

8. The system of claim 1 wherein the communication link is a telephone system.

9. The system of claim 1 including an isolating relay connected between the output of the sensor means and said recording and counting means.

10. The system of claim 1 wherein the sensor means includes a plurality of sensors providing a plurality of channels of digital data responsive to predetermined variables, including counting means, storage means, and threshold means responsive to the data provided by each of the sensors.

11. The system of claim 1 including first alarm storage means connected to store an alarm signal from the threshold means until a pulse is provided by the timing means.

12. The system of claim 1 including second alarm storage means connected to store an alarm signal when the communication link is already activated when the alarm signal is provided.

13. The system of claim 1 including first and second alarm storage means, said first alarm storage means being connected to store an alarm signal from the threshold means until a pulse is provided by the timing means, and said second alarm storage means being connected to store the alarm signal from said first alarm storage means when the communication link is already activated when the first alarm storage means provides the alarm signal.

14. The system of claim 1 wherein the count storage means includes latch means, and including reset means which resets the latch to store the count from the counting means, and sets the latch means to hold the count, in response to a single pulse from the timing means.

15. A method of monitoring an environmental variable and alerting a remote location when the variable exceeds a predetermined magnitude, comprising the steps of:

sensing a predetermined variable and providing a data signal responsive to the magnitude of the variable, converting the data signal to data pulses having a frequency responsive to the magnitude of the data signal, providing spaced timing pulses, recording the data pulses and spaced timing pulses, counting the data pulses occurring in the interval between timing pulses, comparing the count as it is obtained during each interval with a preset magnitude, storing the count at the end of each interval, activating a communication link when a count exceeds a preset magnitude, and transferring the count to a remote point via the communication link when it is activated.

16. The method of claim 15 including the step of initiating an alarm at the remote point in addition to transferring the count thereto.

17. The method of claim 15 wherein the step of transferring the count to a remote point includes the steps of transferring the stored count to a shift register, and clocking the count from the shift register to the remote point.

18. The method of claim 15 including the step of isolating the recording step from the counting step by providing two independent sets of data pulses in response to the data signal.

19. The method of claim 15 including the steps of sensing additional variables and providing data signals responsive to the additional variables, converting the data signals of the additional variables to data pulses, recording the data pulses of the additional variables, counting the data pulses of the additional variables, storing the counts responsive to the additional variables, comparing the counts as they are obtained during a time interval with preset magnitudes for each of the variables, and activating the communication link when the count associated with any of the variables exceeds their preset magnitudes.

20. The method of claim 11 including the steps of providing an alarm signal when a count exceeds the preset magnitude during the step of comparing the count as it is obtained with a preset magnitude, storing the alarm signal until a timing pulse is received, and using the alarm signal to initiate the step of activating the communication link when the timing pulse is received.

21. The method of claim 11 including the steps of providing an alarm signal when a count exceeds the preset magnitude during the step of comparing the count as it is obtained with a preset magnitude, and storing the alarm signal until the communication link is inactive.

22. The method of claim 11 including the steps of providing an alarm signal when a count exceeds the preset magnitude during the step of comparing the count as it is obtained with a preset magnitude, storing the alarm signal in first means until a timing pulse is received, and storing the timing pulse in second means until the communication link is inactive.

* * * * *